(12) United States Patent
Pays et al.

(10) Patent No.: US 7,678,286 B2
(45) Date of Patent: Mar. 16, 2010

(54) SMALL DROPLETS RECOVERY SYSTEM

(75) Inventors: Christian Pays, Fontenay Le Fleury (FR); Christophe Corailler, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/597,124

(22) PCT Filed: Jan. 10, 2005

(86) PCT No.: PCT/EP2005/000227

§ 371 (c)(1),
(2), (4) Date: Jul. 12, 2006

(87) PCT Pub. No.: WO2005/070514

PCT Pub. Date: Aug. 4, 2005

(65) Prior Publication Data

US 2007/0039892 A1    Feb. 22, 2007

(30) Foreign Application Priority Data

Jan. 27, 2004    (EP) ................................. 04290203

(51) Int. Cl.
*B01D 17/02*    (2006.01)
(52) U.S. Cl. ..................... 210/802; 210/521; 210/540; 210/DIG. 5
(58) Field of Classification Search .................. 210/799, 210/800, 802, 300, 301, 306, 496, 521, 522, 210/540, DIG. 5
See application file for complete search history.

(56) References Cited

U.S. PATENT DOCUMENTS

| | | | | |
|---|---|---|---|---|
| 2,405,838 A | * | 8/1946 | Lawson et al. ......... | 210/DIG. 5 |
| 2,731,150 A | * | 1/1956 | McCann ................ | 210/DIG. 5 |
| 3,231,091 A | * | 1/1966 | Kingsbury et al. ..... | 210/DIG. 5 |
| 3,914,175 A | | 10/1975 | Kunz et al. | |
| 3,957,656 A | * | 5/1976 | Castelli ............... | 210/521 |
| 4,022,694 A | | 5/1977 | Fruman | |
| 4,123,365 A | | 10/1978 | Middelbeek et al. | |

(Continued)

FOREIGN PATENT DOCUMENTS

DE    3151749    7/1983

(Continued)

*Primary Examiner*—Christopher Upton
(74) *Attorney, Agent, or Firm*—Darla P. Fonseca; Jaime Castano

(57) ABSTRACT

A system for separating an emulsion fluid into a recovered fluid and a purified fluid. The emulsion fluid comprises a continuous phase and a dispersed phase. The purified fluid is essentially constituted of the continuous phase. The system comprises a vessel at an inlet of which the emulsion fluid may flow. The system further comprises one or more coalescing elements made of Reusable Polymer Absorbent material. Each coalescing element allows to coalesce at least a portion of the dispersed phase from small droplets into large drops further detached from the coalescing element upon a flow of the emulsion fluid. The system further comprises one or more separating and guiding means made of oleophilic material. Each separating and guiding means is located a distance from an associated coalescing element and is disposed at an output of the associated coalescing element to guide the detached large drops for further recovery. The separating and guiding means has a structure that is adapted to allow the continuous phase to flow through the separating and guiding means.

10 Claims, 5 Drawing Sheets

U.S. PATENT DOCUMENTS 4,278,545 A * 7/1981 Batutis et al. ............... 210/521
4,650,581 A    3/1987 Angles et al.
5,531,890 A    7/1996 Keenan et al.
5,762,810 A * 6/1998 Pelton et al. ............... 210/799

FOREIGN PATENT DOCUMENTS

| | | |
|---|---|---|
| DE | 29616832 | 12/1996 |
| EP | 0566035 | 10/1993 |
| EP | 0702991 | 3/1996 |
| GB | 1418806 | * 12/1975 |
| WO | WO 02/20115 | * 3/2002 |

\* cited by examiner

SMALL DROPLETS RECOVERY SYSTEM

BACKGROUND OF INVENTION

1. Field of the Invention

The invention relates generally to the separating of small droplets from a continuous phase of an emulsion fluid with a coalescing element.

2. Background Art

Filtering a fluid comprising two non-miscible phases is a common operation. Typically the fluid may be stored in a container during a given time: a first phase and a second phase may separate upon gravity. The phase having the smallest density is then collected at a surface of the fluid.

However, the fluid may be under a form of an emulsion comprising a continuous phase and a dispersed phase. The emulsion may be relatively stable, in particular if a surfactant is added at a forming of the emulsion.

A separator packing allows to separate a dispersed oily phase from a continuous phase. The separator packing comprises a plurality of plates that are made of an oleophilic material so that drops of the dispersed oily phase adhere to the plates. The plates are oriented in a diagonal direction in such a way that the coalesced drops move upward along the plates upon a pressure generated by a flow of the continuous phase. The continuous phase flows through the separator packing. In case of a further phase that is solid, particles of the solid phase are intercepted by the separator packing and drop at the bottom of the separator under the effect of gravity. The separator packing hence guides the dispersed oily phase upward, the solid phase downward and let the continuous phase flow.

However, if the dispersed phase is in a form of relatively small droplets, the effect of the gravity is minimized. It may hence take a relatively long time to separate an emulsion by storing it in a container. Under such circumstances, a separator packing provides a relatively low efficiency in separating small droplets from a continuous phase.

British Patent 1 418 806 to Continental oil Co, published Dec. 24, 1975, discloses a process for separating the phases of an emulsion comprised of water and of a petroleum hydrocarbon. The process comprises passing the emulsion through a bed of polyurethane foam. Upon saturation of the polyurethane foam, the hydrocarbon dispersed phase is coalesced into droplets. If the droplets are less dense than water, the droplets rise to form an hydrocarbon layer that is above a water layer. Portions of the hydrocarbon layer and of the water layer are continually drawn off, thus effecting the separating.

U.S. Pat. No. 5,239,040 to E.R.T. Environmental Research Technology K.S.P.W. Inc. (CA), published Aug. 24, 1993, describes a polyurethane particulate liquid absorbent. The absorbent is prepared from specific reactants using a particular process. The absorbent is suitable for use in cleaning up liquids contaminated with oil droplets. The absorbent allows to intercept the oil droplets. The absorbent and the intercepted oil droplets may be separated by a centrifugation step, thus providing recovered oil, and oil-free absorbent for re-use.

International application WO02/20115 to EARTH CANADA CORP (CA), published Mar. 14, 2002, discloses a system in which a plurality of Reusable Polymer Absorbent (RPA) beds are exposed to a flow of an emulsion of oil droplets into water. The RPA beds are made of a polyurethane foam shredded in small flakes so as to increase a surface area offered to the flow. The polyurethane particulate liquid absorbent described in the U.S. Pat. No. 5,239,040 may be used.

FIG. 1A, FIG. 1B and FIG. 1C illustrate a coalescing of the oil droplets at a RPA bed according to prior art. A flow of an emulsion comprising a water continuous phase 13 and oil droplets 12 passes through RPA elements 11. As represented in FIG. 1A, the RPA elements 11 intercept oil droplets. Despite the intercepted droplets 14 that adhere to the RPA elements 11, the emulsion may still comprise free droplets 17 at an outlet of the RPA elements 11.

The intercepted droplets 14 may, upon the flow of the emulsion, form a layer 16 at a surface of the RPA elements 11, as represented in FIG. 1B.

As the layer 16 increases, the flow of the emulsion creates an increasing shearing force onto the layer 16. Consequently, large oil drops 15 may form from the layer 16 and be entrained by the flow as represented in FIG. 1C.

A creaming of an emulsion, i.e. a velocity of a given drop upon gravity is governed by Stoke's law: the large oil drops 16 move upward faster than the oil droplets (12, 17).

FIG. 2 illustrates a system for separating oil droplets from a continuous water phase according to prior art. A plurality of RPA beds (27a, 27b) are provided within a vessel 28 through which an emulsion fluid comprising oil droplets (22a, 22b, 22c) among a continuous water phase 23 may flow.

A first RPA bed 27a allows to form large oil drops 25a from the oil droplets 22a. An number of non retained oil droplets 22b may pass trough the first RPA bed 27a without adhering to any RPA element (not represented on FIG. 2) of the first RPA bed 27a. The large oil drops 25a move upward upon gravity faster than the oil droplets 22b. The large oil drops form at a surface of the water phase an oil layer 24. A recovery outlet, e.g. a recovery pipe 29 at the surface allows to recover the oil layer 24.

A similar process is iterated via a second RPA bed 27b and further RPA beds (not represented on FIG. 2) for further cleaning if necessary. It is desirable to avoid the large oil drops 25a generated at the first RPA bed 27a to enter the second RPA bed 27b. The recovering of the large oil drops 25a depends on a plurality of parameters: a velocity of the flow of emulsion fluid, a density of oil, a density of water, a distance between the first RPA bed 27a and the second RPA be 27b, and a height between the large oil drop at the first RPA bed 25a and the oil layer 24. In order to insure an efficient separating of the oil droplets 22a from the continuous water phase 23, the RPA beds (27a, 27b) may be positioned at a relatively high distance.

SUMMARY OF INVENTION

In a first aspect, the invention provides a system for separating an emulsion fluid into a recovered fluid and a purified fluid. The emulsion fluid comprises a continuous phase and a dispersed phase. The purified fluid is essentially constituted of the continuous phase. The system comprises a vessel at an inlet of which the emulsion fluid may flow. The system further comprises one or more coalescing element. Each coalescing element allows to coalesce at least a portion of the dispersed phase into large drops further detached from the coalescing element upon a flow of the emulsion fluid. The system further comprises one or more guiding mean. Each guiding mean is associated with one coalescing element to guide the detached large drops for further recovery.

In a first preferred embodiment, the system further comprises one or more bed, each bed allowing to support one coalescing element. The system further comprises one or more recovery outlet. Each recovery outlet allows to recover the recovered fluid from large drops detached from one coalescing element.

In a second preferred embodiment, the guiding means is a separator packing. The separator packing has a structure that is adapted to allow the continuous phase to flow through the separator packing.

In a third preferred embodiment, each separator packing is substantially located at 10 millimeters of the associated coalescing element so as to allow a burst of bubbles of the continuous phase. The bubbles are surrounded by a film of the dispersed phase. The bubbles are formed between the coalescing element and the separator packing.

In a fourth preferred embodiment, each separator packing comprises a plurality of plates disposed at an output of the at least one associated coalescing to intercept the large drops. The dispersed phase comprises oil droplets. The plurality of plates are made of an oleophilic material so that the intercepted large drops adhere to the plates The plurality of plates have a diagonal orientation adapted for guiding the adhered large drops upward.

In a fifth preferred embodiment, the emulsion fluid is a produced water associated with a production of hydrocarbons. The coalescing element is a Reusable Polymer Absorbent.

In a second aspect, the invention provides a method for separating an emulsion fluid into a recovered fluid and a purified fluid. The emulsion fluid comprises a continuous phase and a dispersed phase. The purified fluid is essentially constituted of the continuous phase. The method comprises providing a flow of at least a portion of the emulsion fluid through at least one bed within a vessel. Each bed supports a coalescing element, whereby at least a portion of the dispersed phase coalesces into large drops. The coalesced large drops are detached from each bed by means of a flow velocity. The detached large drops are guided with at least one guiding mean. The at least one guiding mean is associated with the at least one bed. The method further comprises recovering the recovered fluid from the guided large drops.

In a sixth preferred embodiment, the method further comprises repeating the coalescing, the detaching, the guiding and the recovering at a further location of the vessel.

In an seventh preferred embodiment, the dispersed phase comprises droplets of oil.

In a eighth preferred embodiment, the guiding means is a separator packing. The separator packing has a structure that is adapted to allow the continuous phase to flow through the separator packing. The method further comprises intercepting the coalesced large droplets with at least one plate of the separator packing. The large droplets adheres onto the at least one plate. The adhered large droplets are guided along the at least one plate upon a flow velocity.

In a third aspect, the invention provides a system for separating an emulsion fluid into a recovered fluid and a purified fluid. The emulsion fluid comprises a continuous phase, a dispersed phase and a coalesced portion. The purified fluid is essentially constituted of the continuous phase. The system comprises a vessel at an inlet of which the emulsion fluid may flow. At least one bed supports a coalescing element. The coalescing element allows to coalesce at least a portion of the dispersed phase into large drops detached from the coalescing element upon a flow of the continuous phase. The system further comprises at least one weir located along the at least one bed at an upstream side of the at least one bed. Each weir allows to prevent the coalesced portion to flow through an associated bed.

In a ninth preferred embodiment, the system further comprises a recovery outlet located at the upstream side of the bed, the recovery outlet allowing to recover the coalesced portion.

In a tenth preferred embodiment, the coalesced portion results from a pre-treatment of the emulsion fluid before flowing through the bed.

In an eleventh preferred embodiment, the system further comprises a plurality of beds. Each bed supports an associated coalescing element. The coalesced portion provides from previous large drops generated at a distinct previous bed.

In a twelfth preferred embodiment, the dispersed phase comprises oil droplets. The weir is positioned at an upper portion of the vessel.

In a thirteenth preferred embodiment, the emulsion fluid is a produced water associated with a production of hydrocarbons. The coalescing element is a Reusable Polymer Absorbent.

In a fourth aspect, the invention provides a method for separating in a vessel an emulsion fluid comprising a continuous phase, a dispersed phase and a coalesced portion into a recovered fluid and a purified fluid. The purified fluid is essentially constituted of the continuous phase. The method comprises preventing the coalesced portion to flow through a bed located in the vessel. At least a portion of the dispersed phase is coalesced into large drops. The coalescing is performed by means of a coalescing element supported by the bed. The large drops are detached from the coalescing element upon a flow of the continuous phase.

In a fourteenth preferred embodiment, the preventing is performed by inserting a weir along the bed at an upstream side of the bed.

In a fifteenth preferred embodiment, the coalesced portion results from a pre-treatment of the emulsion fluid within the vessel.

In a sixteen preferred embodiment, the coalesced portion results from a coalescing action of a distinct coalescing element supported by a distinct previous bed within the vessel.

Other aspects and advantages of the invention will be apparent from the following description and the appended claims.

DETAILED DESCRIPTION

A vessel system according to prior art comprising a plurality of RPA beds—or any bed supporting coalescing element through which an emulsion may flow—allows to separate small droplets of the emulsion from a continuous phase. The coalescing element allows to generate large drops by coalescing the droplets. The large drops are detached from the coalescing element upon a flow of the emulsion. The large drops move to a surface of the continuous phase upon gravity and may be easily recovered. Each bed of coalescing element needs to be positioned at a relatively high distance from others beds so as to avoid the large drops generated at a determined bed to enter a farther bed before being recovered.

However, because of the relatively high distance between two coalescing elements, the vessel system may have a relatively long length.

Such vessel system may for example be used in petroleum industry. The production of hydrocarbons is usually associated with the generation of a produced water. The produced water needs to be cleaned from oil before disposal. The vessel system allows to separate a last fraction of oil present in the water as an emulsion. In case of an offshore installation, the length of the vessel is a crucial factor as a vessel having a relatively short length is easier to accommodate.

There is a need for a separating system allowing to separate small droplets from a continuous phase of an emulsion that has a relatively short length so as to allow an easier manipulating. Such a separating system may be used in the petroleum industry as well as in any other industry. Typically, many industries produce oily water as a byproduct.

Drops Guidance

Figure 1C:
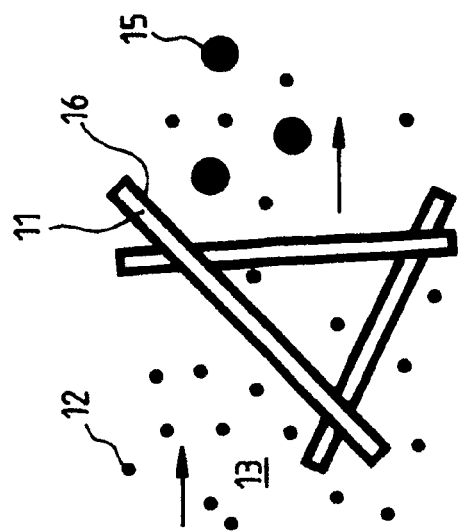
FIG. 1A, FIG. 1B and FIG. 1C illustrate a coalescing of the oil droplets at a RPA bed according to prior art.
Figure 1B:
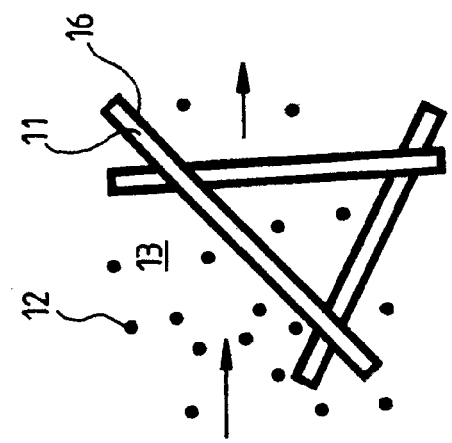
Figure 1A:
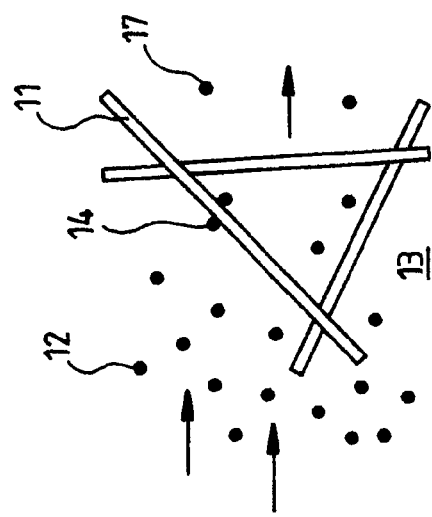
Figure 2:
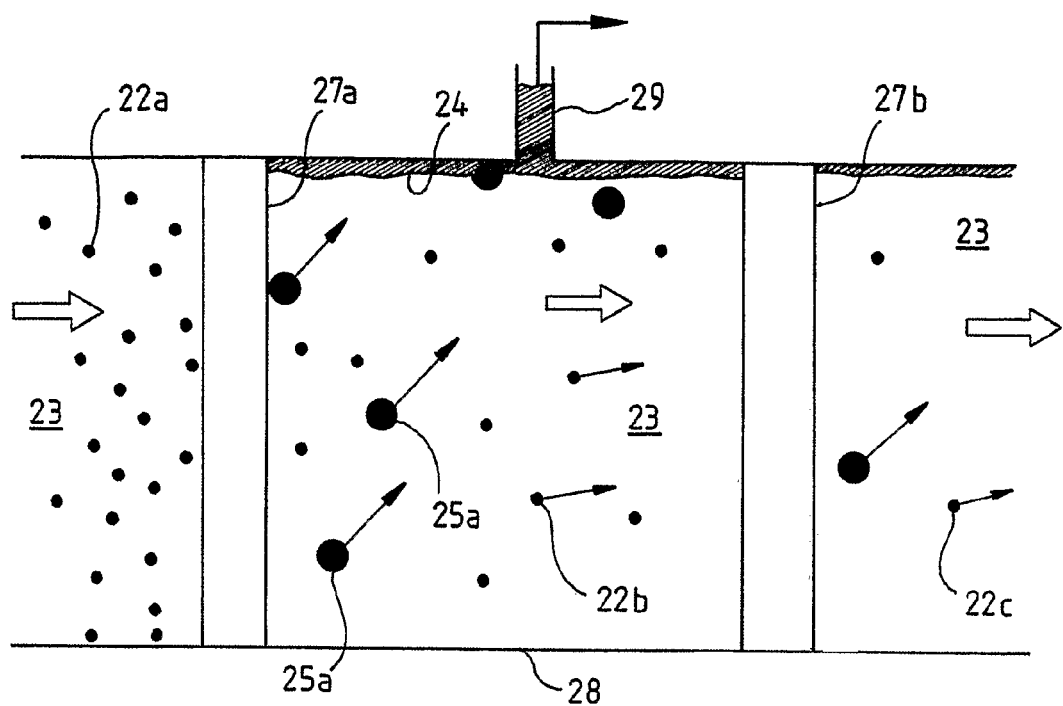
FIG. 2 illustrates a system for separating oil droplets from a continuous water phase according to prior art.
Figure 3:
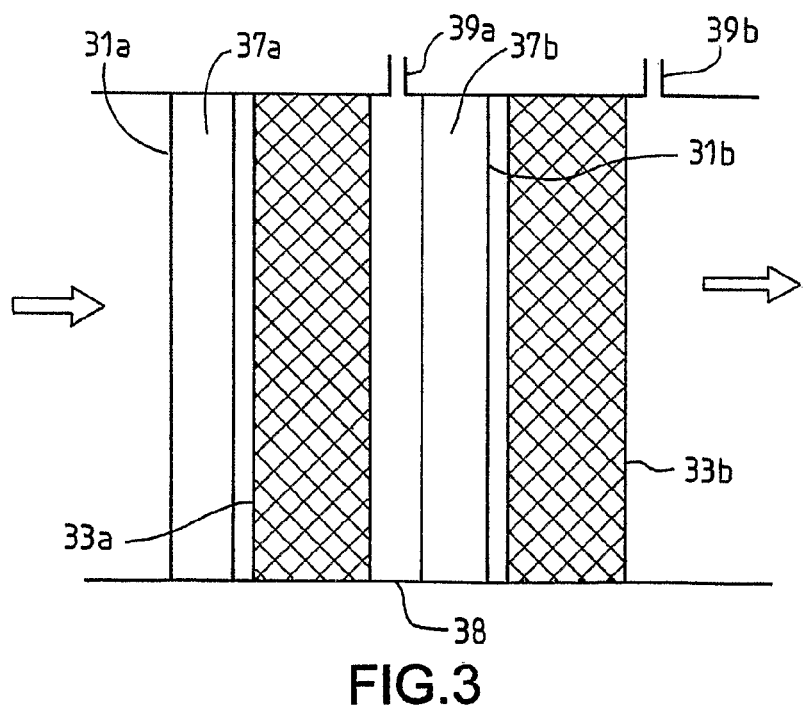
FIG. 3 illustrates an example of a system according to a first embodiment of the present invention.

FIG. 3 illustrates an example of a system according to a first embodiment of the present invention. The system allows to separate an emulsion fluid comprising a continuous phase and a dispersed phase into a recovered fluid and a purified fluid. The purified fluid is essentially constituted of the continuous phase. The system comprises a vessel 38. The vessel 38 comprises an inlet through which the emulsion fluid may flow so as to meet one or more coalescing element 37a. Each coalescing element 37a allows to coalesce at least a portion of the dispersed phase into large drops (not represented on FIG. 3). The coalesced large drops are detached from the coalescing element upon a flow of the emulsion fluid. The coalesced large drops are guided for further recovery by a guiding means 33a.

The guiding means, e.g. a separator packing 33a allow to improve a recovering of the recovered fluid, i.e. of the large drops.

Droplets (not represented on FIG. 3) of the dispersed phase may coalesce at the coalescing element and form the large drops. The large drops move to the surface of the fluid upon gravity, and reach the surface faster than the droplets.

Typically, the dispersed phase has a lower density than the continuous phase and the large oil drops hence move upward upon gravity. During the moving up, or at a reaching of an upper side of the vessel, the large drops may meet each other and form a layer (not represented).

The system may comprise a recovery outlet, e.g. a recovery pipe 39a. The recovery pipe allows to recover at least a portion of the layer at surface.

During the moving up, the large drops are deported along a deportation distance because of a flow velocity. The separator packing, as guiding the large drops upward, allows to reduce the deportation distance. It is hence possible to position a further coalescing element 37b at a relatively low distance from the coalescing element 37a.

The vessel according to the first embodiment of the present invention may hence achieve to produce a purified fluid having a same quality as those produced with vessels systems from prior art with a shorter length. The vessel of the present invention is easier to manipulate and may be used in various industries, e.g. an offshore oil/gas exploitation.

In this latter case, the emulsion fluid is a produced water associated with a production of hydrocarbons. The produced water, at the flowing into the vessel may be already relatively clean: the produced water may contain a continuous water phase and oil droplets. The oil droplets have a relatively small diameter and are difficult to remove by traditional separating means. The vessel systems with coalescing elements, whether according to prior art or to the first embodiment of the present invention, allow to separate the oil droplets so as to produce a filtered fluid having a relatively low oil content, e.g. 15 ppm. The vessel systems of the present invention, are, for a given oil content, shorter than the vessel systems from prior art, which may be appreciated for example at a transportation of the vessel system to the offshore oil/gas exploitation.

Typically, the vessel system according to the first embodiment of the present invention may comprise a plurality of beds (31a, 31b), a plurality of coalescing elements (37a, 37b), a plurality of separator packings (33a, 33b) within the vessel 38 and a plurality of recovery pipes (39a, 39b) so as to allow to repeat the coalescing, the guiding and the recovering.

Each coalescing element may be supported by an associated bed. As represented on FIG. 3, a first bed 31a supports the coalescing element 37a and a second bed 31b supports the further coalescing element 37b.

One recovery pipe may be provided for each bed (37a, 37b). Each recovery pipe (39a, 39b) allows to recover the recovered fluid from the large drops detached from one associated bed (37a, 37b).

The separator packing 33a of FIG. 3 guides the large drops coalesced at the first bed 31a for further recovery at a first recovery pipe 39a. Similarly, a second separator packing 33b guides the large drops coalesced at the second bed 31b for further recovery at a second recovery pipe 39b. Each separator packing (33a, 33b) is located downstream of one associated bed (37a, 37b).

The separator packings (33a, 33b) allow to avoid that the large drops flow into a further bed. With the vessels systems from prior art, there is an higher risk that a coalesced large drop enters the further bed. If some large drops enters the further bed, an efficiency of the vessel system to separate droplets from the continuous phase may be considerably reduced. Consequently, the vessels systems from prior art comprises an high number of beds so as to insure that a given dispersed phase content in the purified fluid is achieved. The vessels systems according to the present invention hence allow to provide a lower number of beds to achieve the given dispersed phase content in the purified fluid. Typically, in a case of produced water to be purified, a vessel system according to the present invention comprising eight beds produces a purified fluid having an oil content lower than 15 ppm, whereas in prior art, such oil content is provided with a vessel system comprising twelve beds.

Preferably the dispersed phase of the emulsion fluid comprises droplets of oil. The continuous phase may be for example water, or brine.

Preferably the separator packing is positioned at a certain distance, typically 10 millimeters, of the associated bed. It may happen that bubbles of water form at an output of the bed. The bubbles may, in the vessels systems from prior art, fill a space between two beds. The associated recovery pipe hence recovers bubbles instead of pure oil. The separator packing allows to avoid the recovering of the bubbles of water.

Figure 4A:
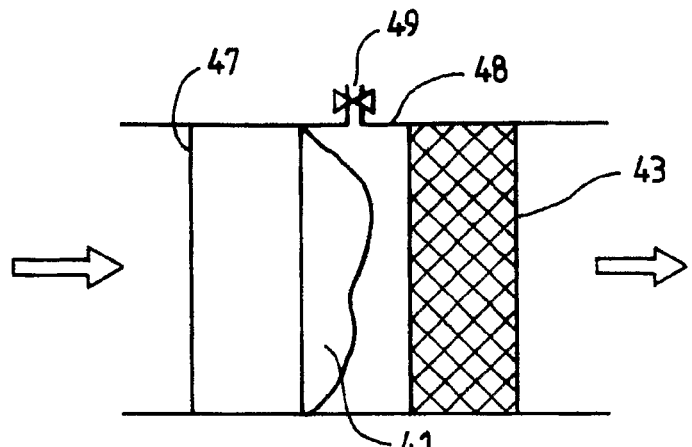
FIG. 4A illustrates a formation of bubbles of water in an example of a system according to the first embodiment of the present invention.

FIG. 4A illustrates a formation of bubbles of water in an example of a system according to the first embodiment of the present invention. A vessel 48 comprises a bed 47 of coalescing material, e.g. RPA polymer. An emulsion fluid comprising a dispersed oil phase into oil droplets (not represented on FIG. 4A) and a continuous water phase (not represented on FIG.

4A) flows through the vessel 48. The RPA polymer allows to form large oil drops (not represented on FIG. 4A) from the oil droplets. It may happen that bubbles of water 41 are surrounded by a film of oil formed at an outlet of the bed 47. In the vessel systems according to the invention, a separator packing 43 is located at a certain distance from the bed 47.

Figure 4B:
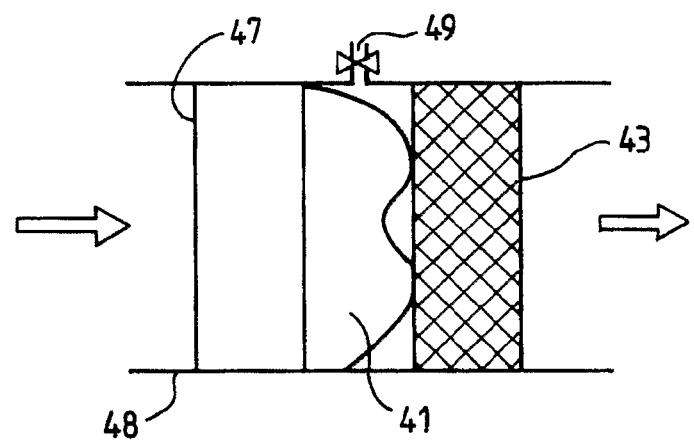
FIG. 4B and FIG. 4C illustrate a burst of bubbles of water in the example of the system illustrated in FIG. 4A.
Figure 4C:
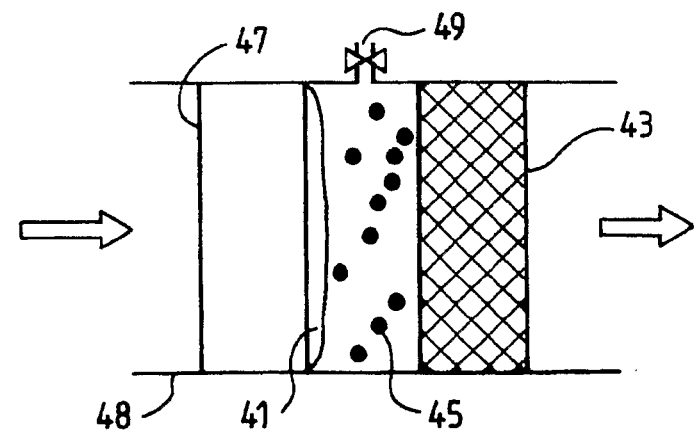

FIG. 4B and FIG. 4C illustrate a burst of bubbles of water in the example of the system already illustrated in FIG. 4A. The bubbles of water 41 may expand and begin to fill a space between the bed 47 and the separator packing 43. When the bubbles 41 reach the separator packing 43, the bubbles 41 burst as illustrated in FIG. 4B. The bursting of the bubbles 41 generates a coalescing of the film of oil into oil drops 45. The oil drops 45 are guided by the separator packing 43. The recovery pipe 49 allows to recover pure oil.

Figure 5:
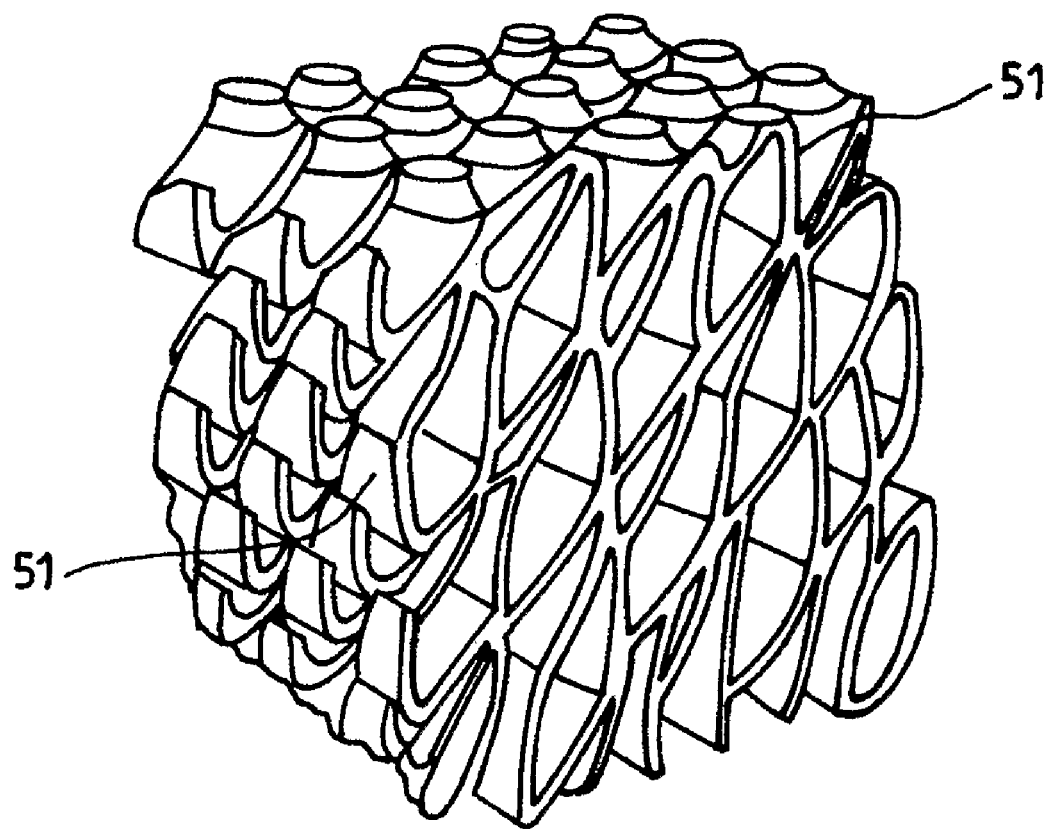
FIG. 5 illustrates an example of a separator packing according to the first embodiment of the present invention.

FIG. 5 illustrates an example of a separator packing according to the first embodiment of the present invention. The separator packing may comprise a plurality of plates 51 that are disposed at an outlet of a associated bed (not represented on FIG. 5) so as to allow large drops (not represented on FIG. 5) coalesced at the bed to intercept the plates 51. If the large drops are made of oil, the separator packing may preferably be made of an oleophilic material: this allows the intercepted large drops to adhere to the plates 51. The plates 51 have a substantially diagonal orientation that is adapted for guiding the adhered large drops upward. The adhered drops may, upon a flow of fluid, be guided along the plates upon a flow velocity, thus being guided upward. On the contrary, a continuous aqueous phase flows through the separator packing.

Weir System

Figure 6:
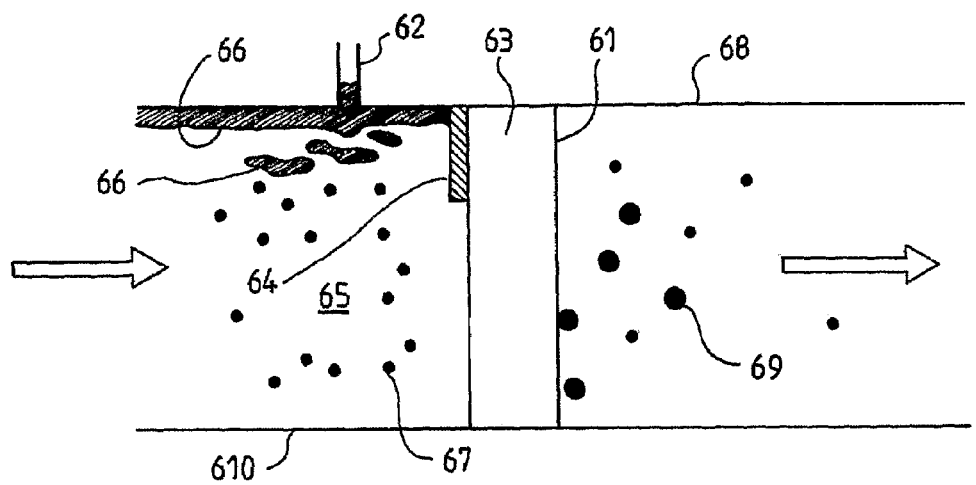
FIG. 6 illustrates a first example of a system according to a second embodiment of the present invention.

FIG. 6 illustrates a first example of a system according to a second embodiment of the present invention. The system allows to separate an emulsion fluid into a recovered fluid and a purified fluid. The emulsion fluid comprises in the second embodiment a continuous phase 65, a dispersed phase 67 and a coalesced portion 66. The purified fluid is essentially constituted of the continuous phase.

The system comprises a bed 61 supporting a coalescing element 63. The coalescing element 63 allows to coalesce at least a portion of the dispersed phase 67 into large drops 69 that are detached from the coalescing element 63 upon a flow of the continuous phase. The system farther comprises a weir 64 located along the bed 61 at an upstream side of the bed 61. The weir 64 allows to prevent the coalesced portion 66 to flow through the bed 61.

Preferably the system comprises a vessel at an inlet of which the emulsion fluid flows into the vessel. The system may comprise further beds (not represented on FIG. 6) to improve the separating.

The system may further comprise a recovery outlet 62, e.g. a recovery pipe, that allows to recover the coalesced portion 66. The recovery pipe is located at the upstream side of the bed 61. If the coalesced portion 66 enters into the bed 61, this has the effect of reducing the quality of the purified fluid. The weir 64, e.g. a metal sheet, allows to isolate the bed 61 from the coalesced portion 66.

A system according to the second embodiment of the present invention may achieve to produce a purified water having a given quality with a lower number of beds than a system from prior art, since the weir prevents a coalesced portion to flow along the vessel. The invention hence allows to provide a separating with a vessel system comprising a relatively low number of beds, i.e. with a vessel that has a relatively short length. The vessel system according to the present invention is hence easier to manipulate than the vessel systems from prior art.

This may be particularly useful in a case of an offshore hydrocarbon exploitation. The production of the hydrocarbon is associated with produced water, i.e. a mixture of an aqueous phase and an oily phase. The mixture needs to be purified for farther disposal. Most of the oily phase may be removed with traditional separating techniques. A vessel system with a coalescing element allows to separate small oil droplets from the aqueous phase. A vessel system according to the present invention may have a shorter length than a vessel system according to prior art and is hence easier to manipulate. Furthermore, the vessel system according to the present invention occupies less space on a boat.

In the first example of system illustrated in FIG. 6, the coalesced portion 66 results from a pre-treatment of the emulsion fluid within the vessel 68. The pre-treatment allows to remove a high percentage of the dispersed phase. The pre-treatment may be relatively basic: for example, the emulsion fluid simply passes through a pre-treatment box 610 of the vessel 68. Most of the dispersed phase may move upward upon gravity at the pre-treatment box 610. The recovery outlet 62 allows to recover the coalesced portion 66.

Figure 7:
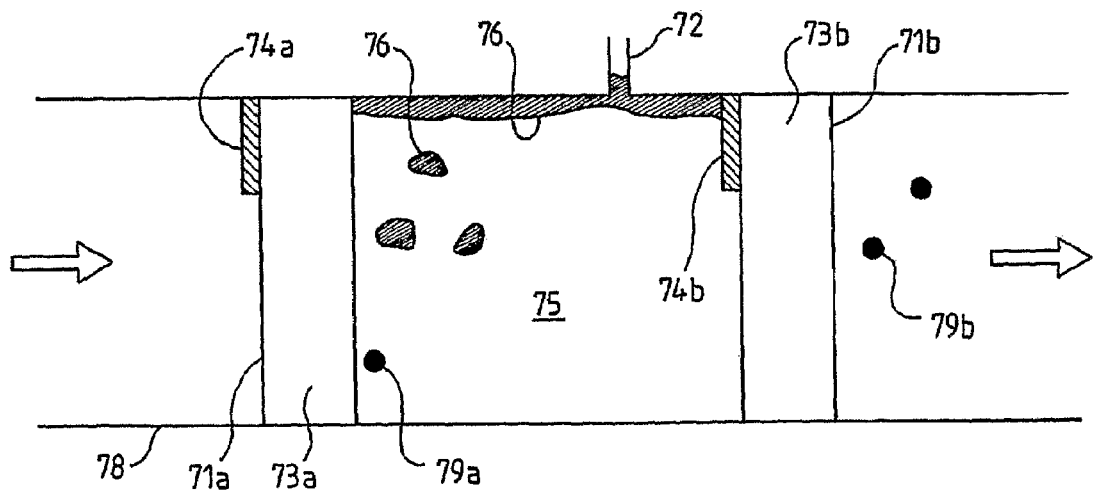
FIG. 7 illustrates a second example of a system according to the second embodiment of the present invention.

FIG. 7 illustrates a second example of a system according to the second embodiment of the present invention. An emulsion fluid comprising a continuous phase 75, a dispersed phase (not represented on FIG. 7) and a coalesced portion 76 may flow through a bed 71*b* that supports a coalescing element 73*b*. The emulsion fluid itself results from an upstream portion of a vessel 78, the upstream portion of the vessel 78 comprising a distinct previous bed 71*a*. A coalescing action of a distinct coalescing element 73*a* supported by the distinct previous bed 71*a* produces large drops 79*a*. The large drops 79*a* move upward upon gravity. In order to avoid that the coalesced portion 66 enters into the bed 71*b*, a weir 74*b*, e.g. a metal sheet, is provided along the bed 71*b*. A recovery outlet 72 allows to remove the coalesced portion 66 while being retained by the weir 74*b*.

The second example of vessel system comprises a plurality of beds (71*a*, 71*b*). Each bed may be associated to a weir (74*a*, 74*b*). Each bed allows to coalesce at least a portion of a dispersed phase of an upstream fluid into large drops (79*a*, 79*b*).

Preferably the coalescing element involved in the first embodiment and the second embodiment of the present invention is a Reusable Polymer Absorbent (RPA), i.e. polyurethane foam shredded in small flakes so as to increase a surface area offered to a flow.

Preferably the vessel system according to the present invention comprises an output pipe that is located downstream of the beds. The output pipe may be oriented downward, so as to insure a prioritized collecting of the purified fluid.

Preferably, the first embodiment of the present invention is combined with the second embodiment.

By "large drop", we means any coalesced fluid having a size that is relatively larger than a size of droplets initially present in an emulsion fluid. The large drops may hence have a substantially spherical shape, a longitudinal shape etc. The large drops may also be a single layer that is detached from a bed, or is formed from substantially spherical drops.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A system for separating a water/hydrocarbons emulsion fluid into a recovered oil fluid and a purified water fluid, the water/hydrocarbons emulsion fluid comprising a continuous phase and a dispersed phase, the purified water fluid being essentially constituted of the continuous phase, the system comprising:
   a vessel at an inlet of which the water/hydrocarbons emulsion fluid may flow;
   one or more coalescing elements made of Reusable Polymer Absorbent material, each coalescing element allowing to coalesce at least a portion of the dispersed phase from small droplets into large drops, said large drops being further detached from the coalescing element upon a flow of the emulsion fluid;
   one or more separating and guiding means made of an oleophilic material, each separating and guiding means being located a distance from an associated coalescing element and being disposed at an output of the associated coalescing element to guide said detached large drops for further recovery and having a structure that is adapted to allow the continuous phase to flow through the separating and guiding means,
   wherein each separating and guiding means comprises:
   a plurality of plates to intercept said detached large drops; wherein:
   the plurality of plates are made of the oleophilic material so that the intercepted large drops adhere to the plates; and
   the plurality of plates have a diagonal orientation adapted for guiding the adhered large drops upward.

2. The system of claim 1, further comprising:
   one or more beds, each bed allowing to support one coalescing element made of Reusable Polymer Absorbent material;
   one or more recovery outlets, each recovery outlet allowing to recover the recovered fluid from large drops detached from one coalescing element.

3. The system of claim 1, wherein each separating and guiding means is substantially located at 10 millimeters from the associated coalescing element so as to allow a burst of bubbles of the continuous phase, the bubbles being surrounded by a film of the dispersed phase, and the bubbles being formed between the coalescing element and the separating and guiding means.

4. A system for separating a water/hydrocarbons emulsion fluid into a recovered oil fluid and a purified water fluid, the water/hydrocarbons emulsion fluid comprising a continuous phase and a dispersed phase, the purified water fluid being essentially constituted of the continuous phase, the system comprising:
   a vessel at an inlet of which the water/hydrocarbons emulsion fluid may flow;
   at least two coalescing elements made of Reusable Polymer Absorbent material, each coalescing element allowing to coalesce at least a portion of the dispersed phase from small droplets into large drops, said large drops being further detached from the coalescing element upon a flow of the emulsion fluid;
   one or more separating and guiding means, each separating and guiding means being associated with one coalescing element and being disposed at an output of the associated coalescing element to guide said detached large drops for further recovery and having a structure that is adapted to allow the continuous phase to flow through the separating and guiding means;
   one or more weirs, each weir being associated with one coalescing element, said weir being located along and at an upstream side of the associated coalescing element, and said weir allowing to prevent the detached large drops of an upstream coalescing element to flow through the associated coalescing element.

5. The system of claim 4, wherein each weir is located at an upper portion of the vessel.

6. A method for recovering from a water/hydrocarbons emulsion fluid a recovered oil fluid and a purified water fluid, the water/hydrocarbons emulsion fluid comprising a continuous phase and a dispersed phase, the purified water fluid being essentially constituted of the continuous phase, the method comprising:
   providing a flow of at least a portion of the water/hydrocarbons emulsion fluid through at least one bed within a vessel, each bed supporting a coalescing element made of Reusable Polymer Absorbent material, whereby at least a portion of the dispersed phase coalesces from small droplets into large drops;
   detaching said large drops from each bed by means of a flow velocity;
   guiding the detached large drops with at least one separating and guiding means made of an oleophilic material, the at least one separating and guiding means being associated with the at least one bed and being located a distance from the at least one associated bed, said separating and guiding means having a structure that is adapted to allow the continuous phase to flow through the separating and guiding means;
   recovering the recovered oil fluid from the guided large drops;
   recovering the purified water fluid from the continuous phase,
   wherein each separating and guiding means comprises a plurality of plates and the method further comprises intercepting said detached large drops via the plurality of plates,
   wherein the plurality of plates are made of the oleophilic material so that the intercepted large drops adhere to the plates, and
   the plurality of plates have a diagonal orientation and the method further comprises guiding the adhered large drops upward via the diagonal orientation.

7. The method of claim 6, further comprising:
   repeating the coalescing, the detaching, the guiding and the recovering steps at a further location of the vessel.

8. The method of claim 6, further comprising:
   intercepting the detached large drops with at least one plate of the separating and guiding means, the large drops adhering onto the at least one plate;
   guiding the adhered large drops along the at least one plate upon a flow velocity.

9. A method for recovering from a water/hydrocarbons emulsion fluid a recovered oil fluid and a purified water fluid, the water/hydrocarbons emulsion fluid comprising a continuous phase and a dispersed phase, the purified water fluid being essentially constituted of the continuous phase, the method comprising:
   providing a flow of at least a portion of the water/hydrocarbons emulsion fluid through at least two beds within a vessel, each bed supporting a coalescing element made of Reusable Polymer Absorbent material, whereby at least a portion of the dispersed phase coalesces from small droplets into large drops;
   detaching said large drops from each bed by means of a flow velocity;

guiding the detached large drops with at least one separating and guiding means, the at least one separating and guiding means being associated with the at least one bed, said separating and guiding means having a structure that is adapted to allow the continuous phase to flow through the separating and guiding means;

recovering the recovered oil fluid from the guided large drops;

recovering the purified water fluid from the continuous phase; and allowing to prevent the detached large drops of an upstream coalescing element to flow through an associated coalescing element with one or more weirs, each weir being associated with one coalescing element, said weir being located along and at an upstream side of the associated coalescing element.

10. The method of claim 9, wherein each weir is located at an upper portion of the vessel.

* * * * *